Nov. 26, 1963  J. L. LUMMUS ETAL  3,111,999
PRODUCT AND METHOD FOR REMOVING OIL-BRINE
MIXTURES FROM WELLS
Filed June 6, 1960
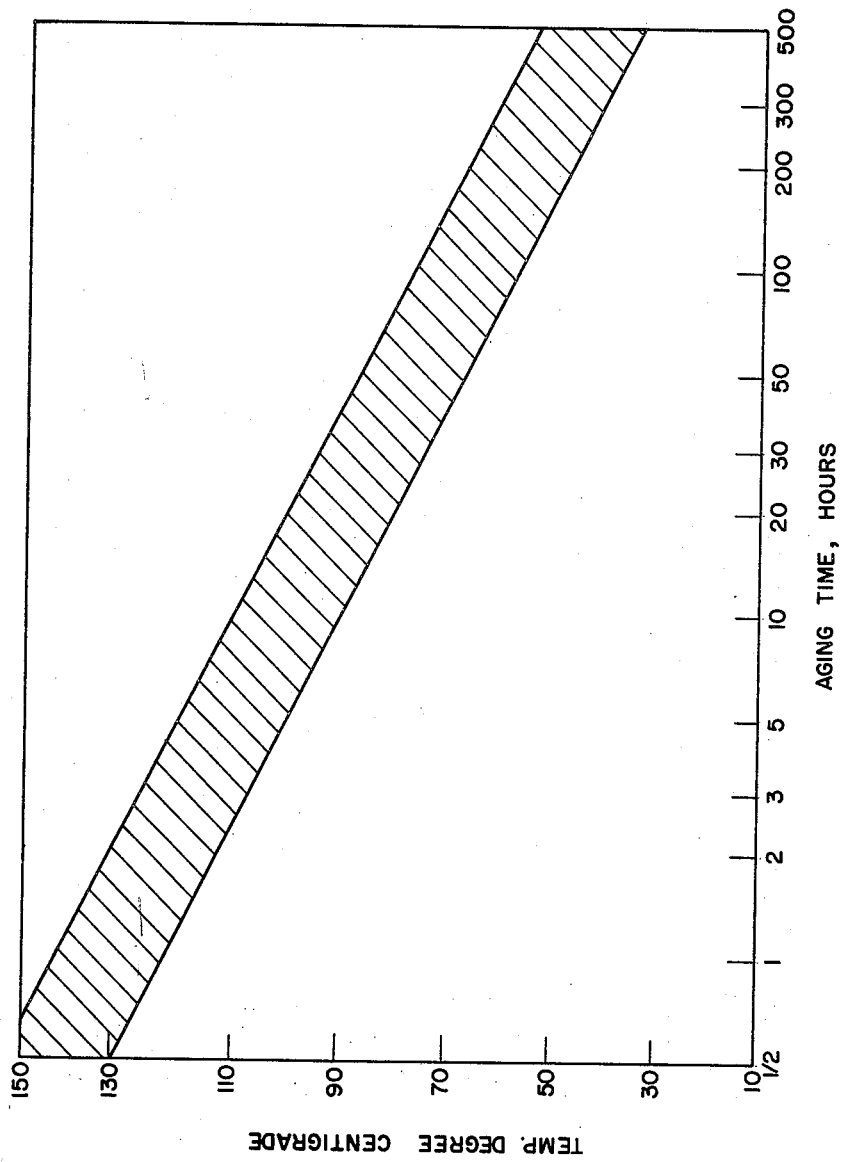
JAMES L. LUMMUS
BILLY V RANDALL
*INVENTORS*
BY
*ATTORNEY*

United States Patent Office 3,111,999
Patented Nov. 26, 1963

3,111,999
PRODUCT AND METHOD FOR REMOVING OIL-BRINE MIXTURES FROM WELLS
James L. Lummus and Billy V. Randall, Tulsa, Okla., assignors to Pan American Petroleum Corporation, Tulsa, Okla., a corporation of Delaware
Filed June 6, 1960, Ser. No. 34,110
12 Claims. (Cl. 175—68)

The present invention relates to new compositions of matter having novel surface active properties. More particularly, it is concerned with a reaction product of a higher molecular weight alcohol with an alkylene oxide and with a means by which the surface active properties of these compositions can be drastically altered. Specifically, the invention is directed to surface active agents that foam readily in the presence of aqueous hydrocarbon systems and the application of such agents for the removal of these aqueous hydrocarbon mixtures during air drilling or work-over operations in oil or gas wells.

The technique of drilling wells with air, natural gas or equivalent gases, all of which are hereinafter referred to as "gas," is a development which has been employed in the drilling of oil wells for a period of approximately twenty years. For a number of reasons, however, this method did not receive much attention until about ten years ago, when various combinations of circumstances pointed to several advantages in gas drilling. Some of the first large scale drilling operations occurred in the San Juan Basin. In this area, water for conventional rotary drilling was difficult to obtain. Large supplies of gas were available and the formations being drilled in that locality gave very little, if any, trouble from the standpoint of water entry. With this type of operation in formations suited for gas drilling, higher penetration rates and longer bit life can be realized than are possible when using mud as the circulating fluid.

One of the principal disadvantages, however, in drilling with gas has been the difficulty of removing cuttings in the presence of appreciable quantities of formation water. The presence of a considerable quantity of water in the well bore is shown by a spray of water or wet cuttings from the exhaust line or by increasing back pressure. In some instances, the rate of water entry into the well is so high that the back pressure exerted on the gas line by the head of liquid in the hole, either causes a material reduction in drilling rate or results in a complete stoppage of drilling operations, owing to the fact that the compressor capacity is insufficient to lift the slurry of water and cuttings out of the hole. In cases of this sort, expensive water shut-off procedures must be employed before gas drilling can be resumed, or the rest of the hole must be made using mud as the circulating agent, resulting in a very substantial decrease in drilling rate.

In our co-pending application U.S. Serial No. 733,863, filed May 8, 1958, now abandoned, we describe and claim a superior material and method for removing substantial amounts of water from a well bore during gas drilling. While materials of the type mentioned therein work very well where salt water or fresh water are encountered, the presence of oil in the hole, as is often the case, tends to kill the foam, thus preventing further removal of water. Also, other agents are known that are capable of producing foam from mixtures of oil and brine, but are unstable in the presence of drilled solids and, hence, are ineffective. This phenomenon generally occurs when the solids are anionic and the foaming agent is cationic, or vice versa, thereby causing said agent to be removed from solution and thus resulting in a distinct change in the surface active properties of the system. Such agents are not operable for the purposes of our invention because they obviously come in contact with objectionable drilled solids and their surface active properties are thus destroyed.

Condensation products of alcohols and alkylene oxides such as, for example, ethylene or propylene oxides, have been known for some time. However, these products, as they have been prepared in the past, have severe limitations when it is desired to use them as a means for removing water-liquid hydrocarbon mixtures from a well during air drilling.

We have now discovered a type of compound that, insofar as we are aware, is unique in its ability to produce adequate quantities of foam in the presence of mixtures of oil and fresh water or brine during air drilling, so that these mixtures can be removed from the hole at a rate sufficient to prevent interference with the drilling operation.

These compounds, which belong to the class of condensation products referred to above, are generally designated as non-ionic type detergents, and are prepared by condensing a higher molecular weight alcohol, for example, with several mols of ethylene or propylene oxides in the presence of an alkaline catalyst which ordinarily may vary in amount from about 0.1 to about 0.6 weight percent based on the alcohol. The product generally obtained is actually a mixture of oxyethylated alcohols having varying chain lengths. Ordinarily, these materials are prepared by bubbling ethylene oxide into a suitable alcohol contained in a stirred pressure autoclave fitted with cooling coils. Prior to the introduction of reactants, it is generally preferable to flush out the system with an inert gas, such as argon or nitrogen. The temperature of the reaction may vary from about 135° to about 200° C., and the pressures employed usually range from about 40 to 75 p.s.i. Reaction between the alcohol and the oxide is ordinarily quite rapid and is accompanied by generation of considerable heat. When the alkylene oxide is no longer absorbed, the excess oxide is vented to the air and the vessel flushed out with nitrogen or other suitable inert gas. Thereafter, the alkaline catalyst is killed by the addition of sulfuric acid or glacial acetic acid. If the mixture is unduly colored, a decolorizing carbon may be added and the mass agitated at 100° C. for 10 or 15 minutes. The product is then filtered to obtain a material which, on standing, generally is transferred into a white, mushy composition.

The products of our invention are prepared in substantially the same manner as related above, except that after all of the alkylene oxide has been added, the mixture is still held at an elevated temperature for an extended period of time. Alternatively, aging the product at room temperature, typically for three or four weeks, serves to convert it into a material that foams readily in the presence of oil and brine during air drilling. These conditions will be more thoroughly discussed below in connection with reference to the accompanying drawing. In preparing these products which exhibit an unusual capability for producing foams in brine-oil mixtures, we may or may not neutralize the catalyst with acid. Insofar as we have been able to determine, neutralization of the catalyst has very little effect on the performance of these compounds as foamers under the conditions contemplated by our invention.

The importance of the additional heat treatment is apparent from tests we have made with condensation products of this type produced by the prior art methods, i.e., the reaction mixture being cooled about as soon as all of the alkylene oxide has been added. Such products not only proved to be poor foamers in the presence of oil and brine, but were difficult even to dissolve in the mixture. A further distinguishing characteristic of these products is that they possess a sweet, fruit-like odor, particularly when ethylene oxide is used. Our heat treated or aged materials are substantially odorless.

Referring again to the drawing, the relationship is illustrated of time and temperature on surface active properties of the above-mentioned condensation products. Thus, we have found that when such products prepared in the usual way, and after completion of the reaction, are held for a time and at a temperature such that these values, when plotted, define a point of falling within the shaded area of the band shown in the accompanying drawing, a non-ionic surface active agent is produced that is an unusually good foamer in the presence of an oil-brine system. Generally speaking, the time required to bring about this improved property in these condensation products varies inversely with the temperature. Thus, definite improvement in the foaming ability of these products has been shown by heating them over periods ranging from about one-half hour at about 130° to 155° C. to about 150 hours at temperatures from about 50° to about 70° C. From the standpoint of convenience, it is generally desirable to employ this heat treatment immediately or shortly after all of the alkylene oxide has been added. Similar beneficial effects have been obtained, however, by subjecting these condensation products to treatment, in accordance with our invention, days or even weeks after their preparation. We do not know, at present, what physical and/or chemical changes occur when these products are heated or are permitted to stand for extended periods of time at moderate conditions. We do know, however, that such treatment brings about some transformation which imparts to these compounds a distinctly superior ability to produce foam in the presence of oil, brine and drilled solids.

A further surprising feature of our invention is the fact that we have noticed the aforesaid heat treatment to be specific to condensation products of alcohols having from 9 to 13 carbon atoms and, preferably, the primary aliphatic alcohols such as 1-decanol, 1-hendecanol, 1-dodecanol, and 1-tridecanol. Alcohols produced by the now well-known Oxo process are suitable for making these foaming agents. Very little success has been experienced with the $C_8$ and $C_{14}$ alcohol derivatives as foaming agents in oil-brine systems. Generally, we have found that the most efficient foamers in such systems are made from the $C_{10}$ alcohols and ethylene oxide in a molar ratio of 1:15.

To a large extent, the properties of the final condensation product can be controlled by regulating the amount of alkylene oxide, for example ethylene or propylene oxide, permitted to react with the alcohol. While the molar ratio of the oxide-to-alcohol used may vary rather widely, we ordinarily prefer molar ratios of oxide-to-alcohol ranging from about 10:1 to about 20:1, for example 15:1.

In employing these products as foaming agents to remove water during gas drilling, the amount of agent used depends on the rate at which water enters the well bore. Ordinarily, the concentration of agent in the well bore should be from about .005 to about .5 weight percent based on the water therein. On this basis, the preferred concentration of foaming agent may generally range from about .01 to about .2 weight percent. Higher concentrations of foaming agent may be used; however, little improvement is observed when amounts in excess of .5 weight percent are employed.

Our invention will be further illustrated by reference to the following specific examples:

EXAMPLE I

Into a 500 ml. autoclave, fitted with agitating means, was added 0.525 mol of octyl alcohol and 1.5 ml. of an aqueous solution containing 1 gram of sodium hydroxide. The autoclave was then sealed and the contents heated to about 145° C. with stirring. Ethylene oxide (5.25 mols) was then slowly added through an inlet line over a period of one and one-half hours. During this time, the temperature of the reaction mixture varied from 110° to about 158° C., with the maximum pressure reaching about 60 p.s.i. After all of the ethylene oxide had been added, the reaction mixture was maintained at a temperature of about 145° C. for a period of 1 hour and 45 minutes. At the end of that time, the autoclave was vented through a Dry Ice-acetone trap and a water aspirator attached to the trap. The contents of the autoclave were then transferred to a beaker, and amounted to approximately 270 grams. On standing overnight and cooling to room temperature, the material solidified partially to a white, slushy form with a supernatant light yellow layer.

EXAMPLE II

The equipment and procedure employed were essentially the same as those uesd in Example I, except for the fact that ethylene oxide (11.25 mols) was reacted with 1-decanol (0.75 mol) in the presence of 1.0 grams of sodium hydroxide. The time required to add the ethylene oxide was approximately 1 hour and 10 minutes, and involved about 24 separate addiitons of the oxide. The temperature range was mostly between 145° and 155° C. After all of the ethylene oxide had been added, the mixture was heated for one hour at 145° to 150° C. About 600 grams of a clear, yellow liquid product was obtained, which solidified to a white solid on cooling.

EXAMPLE III

The equipment and procedure employed were essentially the same as those used in Example I, except for the fact that ethylene oxide (11.4 mols) was reacted with 1-tetradecanol (0.763 mol) in the presence of 1.0 gram of sodium hydroxide. The alcohol and sodium hydroxide were heated to 145° C. and ethylene oxide was added, but no initial reaction was observed. The temperature was then raised to 175° C. before uptake of the oxide occurred. Addition of the ethylene oxide required a period of 1 hour and 15 minutes, during which time the temperature of the reaction mixture ranged from about 180° to about 200° C. After the addition of ethylene oxide was complete, the temperature of the reaction mixture was held between 150° and 170° C. for an additional hour, then allowed to cool to 70° C. The reaction vessel was then vented and the contents transferred to a suitable container. The yield of product was practically quantitative. The appearance was similar to the material produced in Example II.

EXAMPLE IV

In this run, 0.91 mol of 1-tridecanol and 1.0 gram of sodium hydroxide pellets were added to a pressure autoclave of the type used in the previous examples. This mixture was next heated to 150° C., after which 13.6 mols of ethylene oxide was added over a period of one and one-half hours. The temperature range during this time varied from 140° to 168° C., and mainly between 145° and 160° C. After addition of the ethylene oxide, the temperature of the reaction mixture was maintained at about 155° C. for an additional one and one-half hours. The mixture was then allowed to cool to 70° C., at which time it was removed from the autoclave. On cooling, the product became a white, viscous, opaque mass.

EXAMPLE V

In this run, the same reactants were used in essentially the same proportions as used in Example IV. Addition of ethylene oxide was carried out over a period of about two and one-half hours at temperatures ranging from 135° to 165° C. About 5 minutes after the last addition of ethylene oxide, the reaction product was removed from the reactor. On cooling, the product had an appearance similar to that of Example IV; however, it possessed a distinctly different odor.

The different compounds prepared in accordance with the foregoing examples were then subjected to simulated air drilling tests in accordance with the procedure described in detail in our co-pending application referred to above. Briefly this procedure consists of making up a solution of the foaming agent to be tested and introducing it at a predetermined rate along with a measured flow of air into a suitable column. This column may, for example, be 5½ feet high and 2½ inches I.D., and constructed of a clear plastic, such as Lucite. The entire charge of solution need not be more than about 1 liter. Under specific conditions of air flow, the time required for foam to reach the top of the column is measured and the amount of foam discharged from an outlet at the top of the column is also measured. The quantity of liquid carried over from the column in this manner is determined by adding to the collected foam a small amount of a suitable foam breaker, such as tributyl phosphate. The volume of resulting liquid is then recorded.

In obtaining the information appearing in the table below, test solutions were made up containing 210 grams of salt and 2 ml. of the particular surface active agent under investigation. The resulting mixture was then diluted to 1 liter, and to this was then added 10 ml. of diesel oil.

Table

| Foaming Agent | Foam volume, ml. | Liquid volume, ml. | Foam life, minutes |
|---|---|---|---|
| 1. Product of Example I | | 10 | 2 |
| 2. Product same as that of Example I, except molar ratio of ethylene oxide-to-alcohol was 15:1 | | 5 | 2 |
| 3. Product of Example II | 3,000 | 430 | 8 |
| 4. Product of Example III | (¹) | (¹) | (¹) |
| 5. Product of Example IV | 4,000 | 450 | 8 |
| 6. Product of Example V | 3,000 | 336 | 6 |

¹ Was not operable.

Also, a commercially available foaming agent, prepared by condensing tridecyl alcohol with ethylene oxide, was tested in accordance with the procedure above. In such tests, the active ingredient of the commercial foaming agent was recovered as a residue resulting from a vacuum distillation operation. This residue was divided into portions, one of which was subjected to the same tests as employed in obtaining the information shown in the above table. Under such conditions, it was found that the commercially available foaming agent was 55 percent as effective as foaming agent No. 5, which was arbitrarily selected as the standard, having an effectiveness for water removal of 100 percent. After heat treatment of the second portion of the commercially available product, for ½ hour at 145° C., the water removal efficiency thereof was increased to 75 percent.

Foam life, expressed in minutes, is an important parameter in that it denotes the stability of a foam under various conditions of contamination in test 5, for example, foam was produced for 8 minutes, or approximately 33.3 percent, longer than the 6-minute foam life obtained in test 6. This shows that the product of Example IV produces a more stable foam than the product of Example V.

The information in the foregoing table and accompanying discussion points out distinctly the importance of the subsequent heat treatment of the condensation product after all of the alkylene oxide has been added. That this is true may be seen from the fact that the product made in accordance with the procedure in Example IV, when tested, was able to produce 4000 ml. of foam and 450 ml. of liquid, whereas the product prepared in accordance with Example V, which used a procedure identical with that of Example IV, except no additional heating period was employed, produced 3000 ml. of foam and only 336 ml. of liquid. The above data further points out the fact that the ability of such condensation products to remove foam appears to be restricted to alcohols having from 9 to 13 carbon atoms. Thus, it is shown that with the $C_8$ (Example I) and $C_{14}$ (Example III) alcohols, even with heat treatment, no foam or liquid removal of any conequences was obtained during tests involving condensation products of these alcohols.

The term "aging period" or "aging" as used herein is intended not only to mean temperature-time relationships falling within the shaded area of the curve as shown in the accompanying drawing, but likewise contemplates temperature-time combinations involving times greater than 500 hours which fall within said area if the latter were extended in the same direction as shown. It should also be understood that this aging period occurs under conditions such that the material is not in solution. As we have previously pointed out, the exact structure of our foaming agents and the mechanism by which they are transformed from substantially inactive to highly active and efficient foamers for the purpose of our invention, is unknown to us. However, it is our opinion that little or no aging can transpire as long as the product is in solution. Therefore, the expression "aging" or "aging period," as used in the present description and claims, should be further constructed to mean that the product during this time is substantially free of extraneous solvent materials.

We claim:

1. A new composition of matter characterized by its marked ability to dissolve in and foam an oil-brine mixture as soon as said composition has been prepared, said composition having been formed by reacting a primary aliphatic alcohol having from 9 to 13 carbon atoms with ethylene oxide in the presence of an alkaline catalyst at a temperature of from 135° to about 200° C. and at superatmospheric pressure until said alcohol and oxide have been completely mixed, and thereafter continuing to heat the resulting product at a temperature ranging from about 130° to about 155° C. for about one-half hour to produce said composition, the molar ratios of ethylene oxide to aliphatic alcohol ranging from about 10:1 to about 20:1.

2. A new composition of matter characterized by its marked ability to dissolve in and foam an oil-brine mixture as soon as said composition has been prepared, said composition having been formed by reacting a primary aliphatic alcohol having from 9 to 13 carbon atoms with ethylene oxide in the presence of an alkaline catalyst at a temperature of from 135° to about 200° C. and at superatmospheric pressure until said alcohol and oxide have been completely mixed, and thereafter subjecting the resulting product to an aging period of from about one-half to about 500 hours over a temperature range of from about 165° to about 30° C., respectively, to produce said composition, the molar ratios of ethylene oxide to aliphatic alcohol ranging from about 10:1 to about 20:1.

3. The composition of claim 2 in which the alcohol is a primary aliphatic $C_{10}$ alcohol.

4. The composition of claim 3 in which the molar-ratio of ethylene oxide to $C_{10}$ alcohol ranges from about 10:1 to about 15:1.

5. The composition of claim 2 in which the alcohol is a primary aliphatic $C_{13}$ alcohol.

6. The composition of claim 5 in which the molar ratio of ethylene oxide to $C_{13}$ alcohol ranges from about 10:1 to about 15:1.

7. In a method of drilling a well in which gas is used as the circulation fluid and wherein the rate of influx of aqueous formation liquids is sufficiently high to interfere with the effective removal of cuttings from said well during the drilling thereof, the improvement which comprises adding to the well bore a foaming agent of the class defined by claim 2 in an amount corresponding to from about 0.005 to about 0.5 weight percent based on the water in said well bore, and thereafter removing said formation liquids from the well bore in the form of a foam having cuttings admixed therein.

8. In a method of drilling a well in which gas is used as the circulation fluid and wherein the rate of influx of aqueous formation liquids is sufficiently high to interfere with the effective removal of cuttings from said well during the drilling thereof, the improvement which comprises adding to the well bore a foaming agent of the class defined by claim 3 in an amount corresponding to from about 0.005 to about 0.5 weight percent based on the water in said well bore, and thereafter removing said formation liquids from the well bore in the form of a foam having cuttings admixed therein.

9. In a method of drilling a well in which gas is used as the circulation fluid and wherein the rate of influx of aqueous formation liquids is sufficiently high to interfere with the effective removal of cuttings from said well during the drilling thereof, the improvement which comprises adding to the well bore a foaming agent of the class defined by claim 4 in an amount corresponding to from about 0.005 to about 0.5 weight percent based on the water in said well bore, and thereafter removing said formation liquids from the well bore in the form of a foam having cuttings admixed therein.

10. In a method of drilling a well in which gas is used as the circulation fluid and wherein the rate of influx of aqueous formation liquids is sufficiently high to interfere with the effective removal of cuttings from said well during the drilling thereof, the improvement which comprises adding to the well bore a foaming agent of the class defined by claim 5 in an amount corresponding to from about 0.005 to about 0.5 weight percent based on the water in said well bore, and thereafter removing said formation liquids from the well bore in the form of a foam having cuttings admixed therein.

11. In a method of drilling a well in which gas is used as the circulation fluid and wherein the rate of influx of aqueous formation liquids is sufficiently high to interfere with the effective removal of cuttings from said well during the drilling thereof, the improvement which comprises adding to the well bore a foaming agent of the class defined by claim 6 in an amount corresponding to from about 0.005 to about 0.5 weight percent based on the water in said well bore, and thereafter removing said formation liquids from the well bore in the form of a foam having cuttings admixed therein.

12. In a method of drilling a well in which gas is used as the circulation fluid and wherein the rate of influx of aqueous formation liquids is sufficiently high to interfere with the effective removal of cuttings from said well during the drilling thereof, the improvement which comprises adding to the well bore a foaming agent of the class defined by claim 2, and thereafter removing said formation liquids from the well bore in the form of a foam having cuttings admixed therein.

References Cited in the file of this patent

UNITED STATES PATENTS 2,965,678    Sundberg et al. _____ Dec. 20, 1960

FOREIGN PATENTS 378,318    Great Britain _____ Aug. 11, 1932
719,445    Great Britain _____ Dec. 1, 1954

OTHER REFERENCES

Schwartz: "Surface Active Agents and Detergents," vol. II, pages 163 to 166, 1958.